Dec. 14, 1937.　　　　C. SCHATZ　　　　2,102,546
FINGER RING WELDING APPLIANCE
Filed March 11, 1935
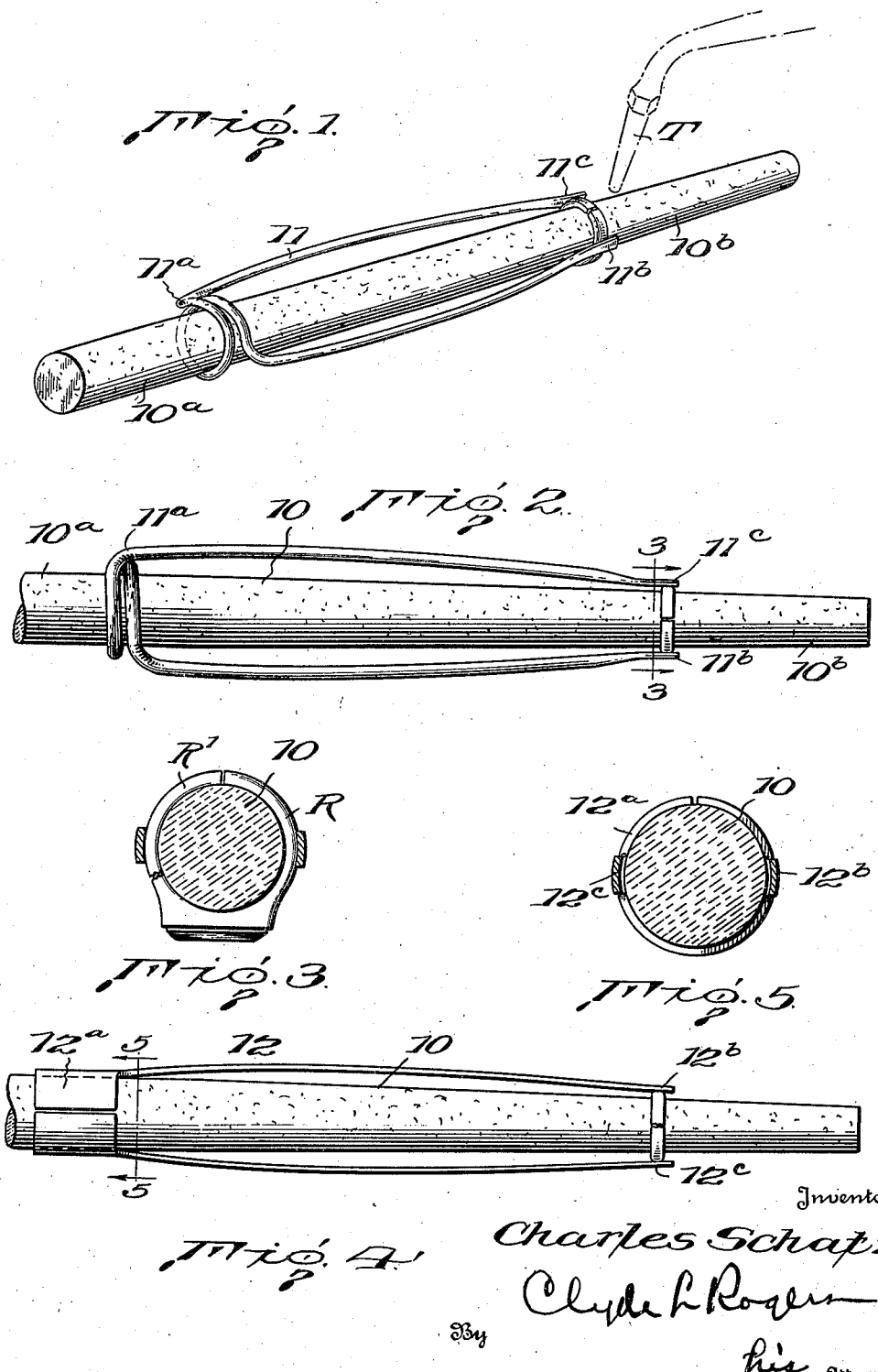

Patented Dec. 14, 1937

2,102,546

UNITED STATES PATENT OFFICE 2,102,546

FINGER-RING WELDING APPLIANCE

Charles Schatz, Los Angeles, Calif., assignor of one-half to Jean P. Spitzel, Los Angeles, Calif.

Application March 11, 1935, Serial No. 10,535

2 Claims. (Cl. 113—99)

In the manufacture and merchandizing of finger rings it is very often necessary to unite portions of the ring, this being required both in assembling the several component parts of the ring when it is initially made and also when a ring has to be made larger or smaller or if the ring is broken. It has for some time been recognized in the trade that welding of the ring portions together when properly carried out is the most efficient and satisfactory union of the parts but autogenous welding of the ring portions has heretofore been a difficult and delicate job requiring a highly skilled workman, largely to avoid the danger of melting adjacent portions of the ring in the welding operation. For this reason ring portions have usually heretofore been united by jewelers by means of soldering instead of welding. This is not satisfactory for several reasons, one of which is that the soldered seam is not strong enough to stand subsequent hammering to size and shape and also since the solder has to be alloyed to a lower melting point than the metal of the ring and the locality of union is always visible in the finished article. In accordance with my invention I provide an improved form of mandrel which is adapted to hold the ring securely for the welding operation, the mandrel being of a character to permit the heat to be localized at the immediate welding point so that a perfect autogenous welding is possible without danger of melting or distorting any adjacent ring portions. The foregoing and other objects and advantages of the invention will be better understood from the following detailed description taken in connection with the accompanying drawing, and the distinctive features of novelty will thereafter be pointed out in the appended claims.

Referring to the drawing:

Figure 1 is a perspective view of a finger-ring welding mandrel embodying the invention and showing a ring mounted thereon in a position for treatment.

Figure 2 is a side elevation thereof on a somewhat larger scale and with a portion broken away.

Figure 3 is a transverse section on a still larger scale on line 3—3 of Figure 2.

Figure 4 is an elevation with a portion broken away showing a modification; and, Figure 5 is a transverse section on a larger scale taken on line 5—5 of Figure 4.

In carrying out my invention I provide a mandrel 10 in shape generally similar to the steel mandrels which have heretofore been employed for mounting rings for hammering to size and shape, this mandrel comprising a cylindrical handle portion 10a and a preferably tapering conical portion 10b on which the finger rings of different sizes may be mounted. The material of this mandrel is of a character to be heat resistant and also relatively non-heat-conductive and for this purpose I have found that hard pressed carbon is very suitable. The finger ring R to be welded is slipped onto the tapered portion 10b of this mandrel up to the part thereof which it fits closely and if there is only one break in the ring no other apparatus is necessary and the ring may be quickly and easily welded by the use of an ordinary oxygen torch T with the application of a piece of scrap metal of the same caratage as the ring at the top of the gap,—in cases where there is a gap between the ring portions, i. e., where the ring is to be enlarged. Since the pressed carbon of the mandrel is a relatively poor heat conductor as compared with steel and other metals, the heat of the torch may be easily localized exactly at the welding point so that there is no danger of melting adjacent portions of the ring. The union thus effected is strong and sturdy enough so that the ring may then be hammered to exact shape and the locality of the weld is entirely indiscernible to the user. In cases where the ring is broken in two or several pieces or where two or more ring portions are to be assembled I provide a ring clamping device 11. This as shown in Figures 1 and 2, comprises a stout wire or rod which is coiled one or more times around the shank or handle portion 10a of the mandrel so as to be slidable there-along with opposite arms extending from such coiled portion and providing opposite clamping fingers 11b and 11c adapted to frictionally and yieldingly press upon the ring portions R and R' respectively to hold them in position for the welding operation.

In Figures 4 and 5 I show a form where the clamp device 12 is produced of sheet or plate metal comprising a split band or thimble portion 12a adapted to frictionally and slidably engage the shank portion 10a of the mandrel with opposite spring arms 12b, 12c extending therefrom providing fingers adapted to engage the respective ring portions the same as in the first described form.

While I have herein shown the carbon mandrel of my invention as having the portion on which the rings are slipped tapering or conical, this in a broader aspect of the invention is not material or essential, since for operating on a number of rings all the same size it would be possible to use a straight or non-tapering mandrel and for working on different sized rings the operator might provide himself with a series of non-tapering or cylindrical carbon rods of different diameters corresponding to the different ring sizes that are used in the jewelry trade.

I am aware that the invention may be embodied in other forms without departing from the spirit or essential attributes thereof, and I therefore desire the present embodiment to be considered in all respects as illustrative and not restrictive, reference being had to the appended claims rather than to the foregoing description to indicate the scope of the invention.

Having now described my invention what I desire to secure by Letters Patent is:

1. A mandrel for finger-ring welding and the like, having a portion on which the finger-ring is fitted composed of heat-resisting and relatively non-heat-conductive molded pressed carbon, said portion being of full circular cross section to constitute a support and backing for the entire inner peripheral extent of the ring at all points and to provide a maximum of frictional engagement with the ring, whereby the ring is held secure for the welding operation.

2. A mandrel for finger-ring welding and the like having a tapering portion circular in cross section to receive and support the entire area of the ring composed of pressed carbon, and a spring clamp device frictionally and adjustably mounted on the mandrel, and presenting spring fingers extending endwise of the mandrel adapted to engage the ring portions to hold them assembled on the mandrel for welding.

CHARLES SCHATZ.